(12) United States Patent
Takahashi et al.

(10) Patent No.: US 11,022,959 B2
(45) Date of Patent: Jun. 1, 2021

(54) WIRELESS COMMUNICATION INTEGRATED WITH A MOTOR CONTROL INTEGRATED CIRCUIT WITHIN A SAME CHIP PACKAGE

(71) Applicant: Infineon Technologies Austria AG, Villach (AT)

(72) Inventors: Toshio Takahashi, Rancho Palos Verdes, CA (US); Wei Wu, Rancho Palos Verdes, CA (US)

(73) Assignee: Infineon Technologies Austria AG

( * ) Notice: Subject to any disclaimer, the term of this patent is extended or adjusted under 35 U.S.C. 154(b) by 62 days.

(21) Appl. No.: 16/156,331

(22) Filed: Oct. 10, 2018

(65) Prior Publication Data
US 2020/0117171 A1 Apr. 16, 2020

(51) Int. Cl.
G05B 15/02 (2006.01)
G05B 19/4155 (2006.01)
H04L 25/49 (2006.01)

(52) U.S. Cl.
CPC ...... G05B 19/4155 (2013.01); H04L 25/4902 (2013.01); G05B 2219/33155 (2013.01)

(58) Field of Classification Search
CPC .................................................. G05B 15/02
USPC ........................................................ 700/275
See application file for complete search history.

(56) References Cited

U.S. PATENT DOCUMENTS 9,746,199 B1* 8/2017 Drees .................. F24F 11/76
10,320,323 B1* 6/2019 Wu .................... H02P 27/085

| 2011/0062900 | A1* | 3/2011 | Shin ...................... H02P 6/04 318/51 |
| 2012/0147879 | A1* | 6/2012 | Guo .................. H04W 72/1242 370/350 |
| 2016/0047391 | A1* | 2/2016 | McPherson ......... F04D 25/0693 417/423.7 |
| 2017/0093310 | A1* | 3/2017 | Fang ..................... H04W 4/80 |
| 2018/0123231 | A1* | 5/2018 | Peterson ............... H02K 11/30 |

(Continued)

FOREIGN PATENT DOCUMENTS

WO 2018098333 A1 5/2018

OTHER PUBLICATIONS

Motive, Neo WiFi, srl © 2018 | Castenedolo (BS) Italy, [Retrieved online] URL: <http://www.motive.it/en/neowifi.php>.

(Continued)

Primary Examiner — Suresh Suryawanshi
(74) Attorney, Agent, or Firm — Design IP

(57) ABSTRACT

A motor controller includes a package configured to interface with a power inverter for motor control; a wireless communication integrated circuit (IC) integrated within the package and configured to receive uplink wireless communication data and to process the uplink wireless communication data, and configured to transmit downlink wireless communication data; a motor controller IC integrated within the package and configured to perform a motor control function, including generating pulse width modulation (PWM) control signals for multi-phase motor control; and an intercommunication interface coupled to the wireless communication IC and the motor controller IC, the intercommunication interface including a plurality of inter-communication wires for information exchange of uplink information and downlink information between the wireless communication IC and the motor controller IC.

25 Claims, 5 Drawing Sheets

(56) References Cited

U.S. PATENT DOCUMENTS

| | | | | |
|---|---|---|---|---|
| 2018/0202698 A1* | 7/2018 | Chretien | ............... | H02K 11/33 |
| 2018/0238577 A1* | 8/2018 | Drees | ...................... | F24F 11/58 |
| 2018/0245831 A1* | 8/2018 | Uemura | .................. | H02P 6/16 |
| 2018/0287466 A1* | 10/2018 | Kim | ..................... | H02M 7/003 |
| 2019/0072984 A1* | 3/2019 | Dougherty | ........... | G05D 1/0022 |
| 2019/0082240 A1* | 3/2019 | Li | ............................ | H04Q 9/00 |
| 2019/0155255 A1* | 5/2019 | Becerra | ............. | G05B 19/4155 |

OTHER PUBLICATIONS

Texas Instruments Incorporated, TI Designs, IoT Wi-Fi Microstepping Stepper Motor Control, 2015, [Retrieved online] URL: <http://www.ti.com/lit/ug/tiduau8/tiduau8.pdf>.

Benjamin Moore, SimpleLink WiFi Enabled Electronic Smart Lock, Application Report SWAA169, Texas Instruments Incorporated, Dec. 2017, [retrieved online May 20, 2019] URL: <http://www.ti.com/lit/an/swaa169/swaa169.pdf>.

\* cited by examiner

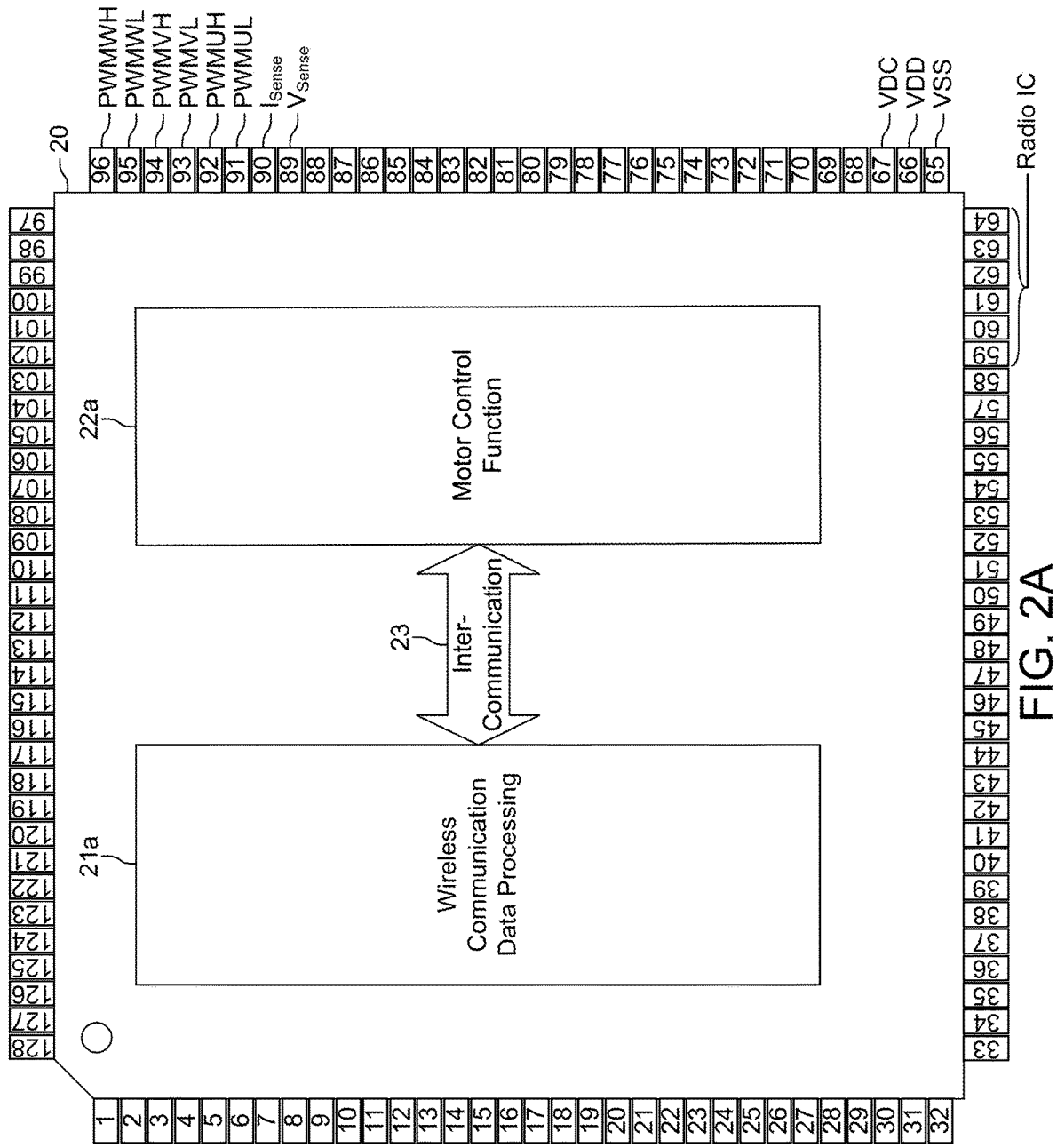

WIRELESS COMMUNICATION INTEGRATED WITH A MOTOR CONTROL INTEGRATED CIRCUIT WITHIN A SAME CHIP PACKAGE

FIELD

The present disclosure relates generally to a motor control function integrated with a wireless communication function, and, more particularly, to a motor control integrated circuit integrated with wireless communication and to methods for operating the same.

BACKGROUND

In motor drive applications, communication to other devices is often required. Traditionally, the communication method has been a wire-based communication to the other devices via a network configuration or a point-to-point configuration. RS-232C, serial real-time communication system (Sercos), and Controller Area Network (CAN) buses are typical examples being adopted in the industry so far.

Information through such communication interfaces ranges from simple start/stop commands to dynamic motion adjustment, including commands for speed synchronization and/or torque command tailoring. However, due to the advent of the emerging Internet-of-Things (IoT), the information exchange to a motor controller will likely dramatically increase in terms of information volume and may be extended to a variety of information exchange methods and protocol types.

This trend is accelerating particularly for the appliance industry where major home appliance electronics start adopting wireless interfaces (e.g., Wifi or Bluetooth).

The spread of smart communication devices such as smartphones and tablets are creating new demand and are also attempting to establish connectivity to all "smart" devices, including smart appliances, in a smart home landscape. For example, such connectivity may enable remote control and monitoring of the smart device. The information exchange over using these types of communications is also becoming more sophisticated.

As a consequence, motor control is an important part in home appliances and in industry automation, and faces new challenges as to more efficient running, more optimized operation by minimizing running electricity cost, more convenience by remote access, and more advanced diagnostics of motor controlled equipment being operated to run "smart." This is not limited only to man-machine interfaces, but also includes machine-machine interfaces. A residential room air conditioner, for example, traditionally requires RS-232C based wire communication between an indoor-unit and an outdoor unit where the main compressor and heat exchange function are located. However due to more intense communication demand and wire harness installation cost, a desire to switch over to wireless communications between the indoor and outdoor units arises.

SUMMARY

Embodiments provide a motor controller that includes a package configured to interface with a power inverter for motor control; a wireless communication integrated circuit (IC) integrated within the package and configured to receive uplink wireless communication data and to process the uplink wireless communication data, and configured to transmit downlink wireless communication data; a motor controller IC integrated within the package and configured to perform a motor control function, including generating pulse width modulation (PWM) control signals for multi-phase motor control; and an intercommunication interface coupled to the wireless communication IC and the motor controller IC, the intercommunication interface including a plurality of inter-communication wires for information exchange of uplink information and downlink information between the wireless communication IC and the motor controller IC.

Embodiments provide a method for wireless communication with a motor controller. The method includes receiving and processing uplink wireless communication data by a wireless communication IC; transmitting downlink wireless communication data by the wireless communication IC; performing a motor control function, including generating pulse width modulation (PWM) control signals for multi-phase motor control by a motor controller IC that is integrated in a same package as the wireless communication IC; and exchanging information via a intercommunication interface coupled to the wireless communication IC and the motor controller IC, the information being exchanged between the wireless communication IC and the motor controller IC as uplink information and downlink information.

BRIEF DESCRIPTION OF THE DRAWINGS

Embodiments are described herein making reference to the appended drawings.

FIG. 2A is a schematic block diagram of an IC package having wireless communication enabled motor control integrated circuit functions according to one or more embodiments;

DETAILED DESCRIPTION

Figure 1A:
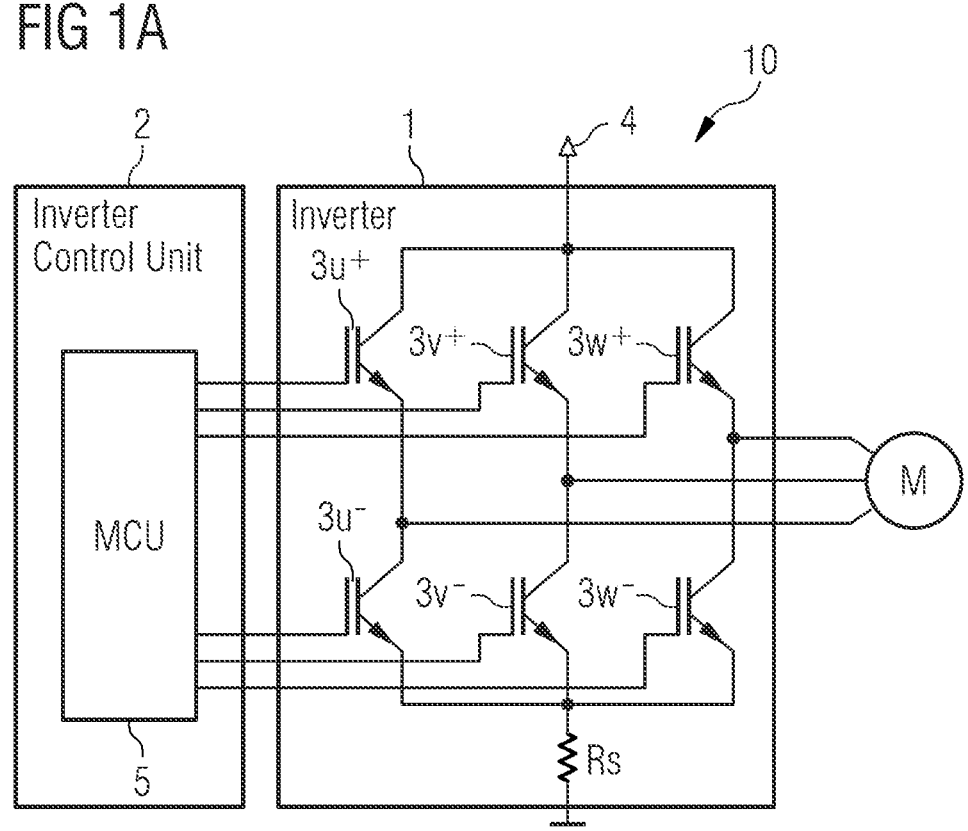
FIG. 1A is a schematic block diagram illustrating a motor control loop of a power semiconductor device according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "front", "behind", "back", "leading", "trailing", "below", "above" etc., may be used with reference to the orientation of the figures being described. Because parts of embodiments can be positioned in a number of different orientations, the directional terminology is used for purposes of illustration and is in no way limiting. It is to be understood that other embodiments may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The term "substantially" may be used herein to account for small manufacturing tolerances (e.g., within 5%) that are deemed acceptable in the industry without departing from the aspects of the embodiments described herein.

A sensor may refer to a component which converts a physical quantity to be measured to an electric signal, for example, a current signal or a voltage signal. The physical quantity may, for example, be a current or a voltage at a shunt resistor in a single-shunt resistor system.

A signal processing circuit and/or a signal conditioning circuit may receive one or more signals from one or more components and perform signal conditioning or processing thereon. Signal conditioning, as used herein, refers to manipulating a signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Thus, a signal processing circuit may include an analog-to-digital converter (ADC) that converts the analog signal from the one or more sensor elements to a digital signal. The signal processing circuit may also include a digital signal processor (DSP) that performs some processing on the digital signal.

Many functions of modern devices in automotive, consumer and industrial applications, such as converting electrical energy and driving an electric motor or an electric machine, rely on power semiconductor devices. For example, Insulated Gate Bipolar Transistors (IGBTs), Metal Oxide Semiconductor Field Effect Transistors (MOSFETs) and diodes, to name a few, have been used for various applications including, but not limited to switches in power supplies and power converters.

A power semiconductor device usually comprises a semiconductor structure configured to conduct a load current along a load current path between two load terminal structures of the device. Further, the load current path may be controlled by means of a control electrode, sometimes referred to as gate electrode. For example, upon receiving a corresponding control signal from, e.g., a driver unit, the control electrode may set the power semiconductor device in one of a conducting state and a blocking state.

A power transistor is a power semiconductor device that may be used to drive a load current. There is a turn-on process and a turn-off process for switching the power transistor on and off. During the turn-on process, a gate driver integrated circuit (IC) is used to provide (source) a gate current to the gate of the power transistor in order to charge the gate. In contrast, during the turn-off process, the gate driver IC is used to draw (sink) a gate current from the gate of the power transistor in order to discharge the gate.

Transistors may include Insulated Gate Bipolar Transistors (IGBTs) and Metal Oxide Semiconductor Field Effect Transistors (MOSFETs) (e.g., Si MOSFETs or SiC MOSFETs). While IGBTs may be used as an example in the embodiments below, it will be appreciated that MOSFETs may be substituted for the IGBTs and vice versa. In this context, when substituting a MOSFET for an IGBT, a MOSFET's drain may be substituted for an IGBT's collector, the MOSFET's source may be substituted for the IGBT's emitter, and the MOSFETs drain-source voltage $V_{DS}$ may be substituted for the IGBT's collector-emitter voltage $V_{CE}$ in any one of the examples described herein. Thus, any IGBT module may be substituted by a MOSFET module and vice versa.

Specific embodiments described in this specification pertain to, without being limited thereto, a power semiconductor device that may be used within a power converter or a power supply. Thus, in an embodiment, the power semiconductor device may be configured to carry a load current that is to be supplied to a load and/or, respectively, that is provided by a power source. For example, the semiconductor device may comprise one or more active power semiconductor cells, such as a monolithically integrated diode cell, and/or a monolithically integrated transistor cell. Such diode cell and/or such transistor cells may be integrated in a power semiconductor module.

Power semiconductor devices that include transistors which are suitably connected to form half-bridges are commonly used in the field of power electronics. For example, half-bridges may be used for driving electric motors or switched mode power supplies.

For example, a multi-phase inverter is configured to provide multi-phase power by supplying multiple phase loads (e.g., a three-phase motor). For instance, three-phase power involves three symmetrical sine waves that are 120 electrical degrees out of phase with one another. In a symmetric three-phase power supply system, three conductors each carry an alternating current (AC) of the same frequency and voltage amplitude relative to a common reference but with a phase difference of one third the period.

Due to the phase difference, the voltage on any conductor reaches its peak at one third of a cycle after one of the other conductors and one third of a cycle before the remaining conductor. This phase delay gives constant power transfer to a balanced linear load. It also makes it possible to produce a rotating magnetic field in an electric motor.

In a three-phase system feeding a balanced and linear load, the sum of the instantaneous currents of the three conductors is zero. In other words, the current in each conductor is equal in magnitude to the sum of the currents in the other two, but with the opposite sign. The return path for the current in any phase conductor is the other two phase conductors. The instantaneous currents result in a current space vector.

A three-phase inverter includes an three inverter legs, one for each of the three phases, and each inverter leg is connected to a direct current (DC) voltage source in parallel to each other. Each inverter leg includes a pair of transistors, for example, arranged in a half-bridge configuration for converting DC to AC. In other words, each inverter leg includes two complementary transistors (i.e., a high-side transistor and a low-side transistor) connected in series and which switch on and off complementary to the each other for driving a phase load. However, multi-phase inverters are not limited to three phases, and may include two phases or more than three phases, with an inverter leg for each phase.

FIG. 1A is a schematic block diagram illustrating a motor control loop 10 of a power semiconductor device according to one or more embodiments. In particular, the motor control loop 10 includes a power inverter 1 and an inverter control unit 2. The inverter control unit 2 may also be referred to as a motor controller or motor control IC.

The motor control loop 10 is further coupled to a three-phase motor M, that includes three phases U, V, and W. The power inverter 1 is a three-phase current generator configured to provide three-phase power by supplying three phase currents to drive the motor M. It will be further appreciated that the power inverter 1 and the inverter control unit 2 may be placed on a same circuit board, or on separate circuit boards.

Deviations in both magnitude and phase may case a loss in power and torque in the motor M. Therefore, the motor control loop 10 is configured to monitor and control the magnitude and phase of the currents supplied to the motor M in real-time to ensure the proper current balance is maintained based on a feedback control loop.

The power inverter 1 includes a switching array of six transistor modules $3u+$, $3u-$, $3v+$, $3v-$, $3w+$, and $3w-$ (collectively referred to as transistor modules 3) arranged in complementary pairs. Each complementary pair constitutes one inverter leg that supplies a phase current to the three-phase motor M. Thus, each inverter leg includes an upper (high-side) transistor module 3 and a lower (low-side) transistor module 3. Each transistor module may include one transistor, and may also include a diode (not shown). Thus, each inverter leg includes an upper transistor and a lower transistor. Load current paths U, V, and W extend from an output of each inverter leg (i.e., the output of each half-bridge) located between complementary transistors and are configured to be coupled to a load, such as motor M. The power inverter 1 is coupled to a DC power supply 4 (e.g., a battery) and to the inverter control unit 2.

In this example, the inverter control unit 2 includes an inverter control circuit (e.g., a motor controller IC) and driver circuit (e.g., a gate driver IC) for controlling the switching array. However, in other examples, the gate driver IC may be integrated on the power inverter 1 (e.g., see gate drive IC in FIG. 3), and, thus, on a separate die from the motor controller IC.

The motor controller IC performs the motor control function of the motor control loop 10 in real-time. Motor control function can include either controlling a permanent magnet motor or an induction motor and can be configured as a sensorless control not requiring the rotor position sensing, as a sensor based control with Hall sensors and/or an encoder device, or as a combination of both sensor based control (e.g., used at lower rotor speeds) and sensorless control (e.g., used at higher rotor speeds).

For example, the inverter control unit 2 may include a microcontroller unit (MCU) 5 as the motor controller IC for generating driver signals for controlling the transistors of each transistor module 3. Thus, load current paths U, V, and W may be controlled by the MCU 5 by means of controlling the control electrodes, sometimes referred to as gate electrodes, of the transistors 3. For example, upon receiving a control signal from the MCU 5, the gate driver IC may set a corresponding transistor in one of a conducting state (i.e., on-state) or a blocking state (i.e., off-state).

The gate driver IC may be configured to receive the control signals from the inverter control unit (e.g., from MCU 5), and turn on or turn off respective transistors 3 in accordance with the received control signals. For example, during the turn-on process of a respective transistor 3, the gate driver IC may be used to provide (source) a gate current to the gate of the respective transistor 3 in order to charge the gate. In contrast, during the turn-off process, the gate driver IC may be used to draw (sink) a gate current from the gate of the transistor 3 in order to discharge the gate.

The inverter control unit 2 or the MCU 5 itself may include a pulse width modulation (PWM) controller, an ADC, a DSP, and/or a clock source (i.e., a timer or counter) used in implementing a PWM scheme for controlling the states of each transistor, and, ultimately, each phase current provided on the respective load current paths U, V, and W.

In particular, the MCU 5 may use a motor control algorithm, such as a field-oriented control (FOC) algorithm, for providing current control in real-time for each phase current output to a multi-phase load, such a multi-phase motor. Motor speed may further be controlled by adding a speed control loop on top of FOC control. Thus, FOC may be considered as an inner control loop and a speed control loop may be considered as an outer control loop. In some cases, motor position may be controlled using a third control loop (e.g., a position control loop) outside of the speed control loop.

For example, during FOC, a motor phase current should be measured such that an exact rotor position can be determined in real-time. To implement the determination of the motor phase current, the MCU 5 may employ an algorithm (e.g., space vector modulation (SVM), also referred as space vector pulse width modulation (SVPWM)) that uses single-shunt current sensing.

Furthermore, the switches 3 (i.e., transistors) of the power inverter 1 are controlled so that at no time are both switches in the same inverter leg turned on or else the DC supply would be shorted. This requirement may be met by the complementary operation of the switches 3 within an inverter leg according to the motor control algorithm.

Figure 1B:
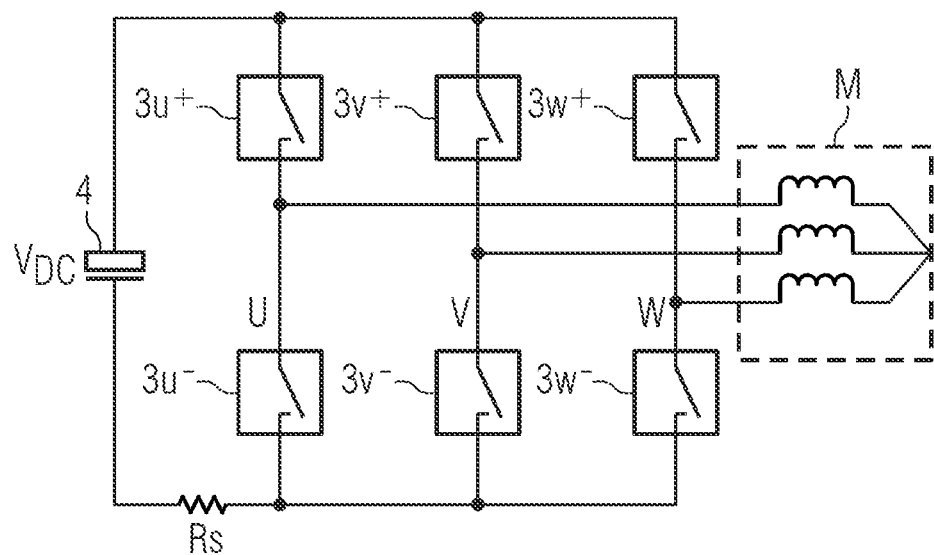
FIG. 1B is a schematic diagram illustrating a power inverter utilizing single-shunt current sensing according to one or more embodiments.

FIG. 1B is a schematic diagram illustrating a power inverter 1 utilizing single-shunt current sensing according to one or more embodiments. In particular, the power inverter 1 includes a shunt resistor Rs placed on the negative DC link of the power inverter 1. The transistors $3_{u+}$, $3_{u-}$, $3_{v+}$, $3_{v-}$, $3_{v+}$, and $3_{w}$, are represented as switches and the motor M is shown with a winding for each of its phases. The MCU 5 in FIG. 1A may receive samples of the current taken from the shunt resistor Rs and then use an algorithm (i.e., software) to re-construct the three-phase current in real-time.

For example, SVPWM is a vector control based algorithm that requires the sensing of the three motor phase currents. By using the single-shunt resistor Rs, DC-link current pulses are sampled at exactly timed intervals. A voltage drop on the shunt resistor Rs may be amplified by an operational amplifier inside inverter control unit 2 and shifted up, for example, by 1.65V. The resultant voltage may be converted by an ADC inside inverter control unit 2. Based on the actual combination of switches, the three-phase currents of the motor M are reconstructed using the SVPWM algorithm. The ADC may measure the DC-link current during the active vectors of the PWM cycle. In each sector, two phase current measurements are available. The calculation of the third phase current value is possible because the three winding currents sum to zero.

SVPWM itself is an algorithm for the control of PWM in real-time. It is used for the creation of AC waveforms, and may be used to drive three-phase AC powered motors at varying speeds from a DC source using multiple class-D amplifiers (e.g., transistors). While the examples herein are described in the context of three-phase motors, the examples are not limited thereto and may be applied to any multi-phase load scheme.

As noted above, there is an increasing demand to exchange information with the motor controller using wireless communication such as Wifi and Bluetooth. In order to meet this demand, the motor control function may be integrated with a wireless communication function, and, more particularly, a motor control IC may be integrated with wireless communication IC in a single IC package.

In general, a radio IC with an antenna may be used for wireless communications, and, specifically, may be used to transmit and receive wireless communication data. A timing of receiving/transmitting communication data and the amount of said data may be user and use case dependent and can be unpredictable. Therefore, enough processing power should be reserved to handle and process communication data efficiently and on demand.

A motion controller IC typically does not have the ability to communicate directly with a radio IC nor does it have the computing power to handle wireless communication data processing. For example, upon receiving raw data from a radio IC, the received raw data requires data handling and processing. The communication data typically requires some immediate response and/or processing such that the communication data is analyzed and appropriate action is taken in response thereto. This processing of communication data can require significant central processing unit (CPU) loading, which the motion controller IC is not capable of handling without interrupting the motor control function. An interruption in the motor control function may cause a PWM cycle to be skipped, and ultimately cause damage to the motor.

As noted above, the motion controller IC is configured for real-time motor control based on a feedback control loop. This real-time processing is performed continuously as the motor is running, and the PWM control signals are updated periodically (i.e., every PWM cycle) based on the real-time processing. For example, in each PWM cycle, the motion controller IC is responsible for measuring motor current and voltage, computing motor control algorithm(s) based on the measured current and/or voltage, and generating instant PWM control signals that are output to the gate driver IC and ultimately applied to the switches 3 for controlling the duty cycle thereof. Thus, there is a continuous processing load on the motor controller IC to perform the motor control function that requires a certain amount of processing power.

The motor controller IC needs to complete the motor control computations (i.e., based on the motor control algorithm(s)) and output PWM control signals for each PWM cycle (e.g., a time interval of approximately 15-45 µs) without interruption that would cause the motor controller IC to exceed the PWM cycle. Exceeding this PWM cycle for the motor control computations may cause damage to the motor.

If the motor controller IC were also responsible for handling wireless communication data processing, this processing load may spike upon receiving communication data from the radio IC. This spike in processing load would run the risk that the motor controller IC could fail to complete the motor control computations for a PMW cycle. That is the real-time motor control functions could be interrupted severely enough that a PWM cycle is missed. Ultimately, a surge significant enough would likely occur due to the nature of communication data and the processing load it requires. Thus, measures should be taken such that the motor control function is safeguarded from such processing load surges, namely processing load surges due to the processing of wireless communication data.

Accordingly, a wireless communication IC may be used as a communication interface between the motion controller IC and the radio IC. The wireless communication IC may be configured with sufficient processing power to handle the communication data processing, while also exchanging information with the motor controller IC related to the motor control function.

For example, the wireless communication IC may process the communication data and provide start/stop commands to the motor controller IC. The wireless communication IC may also provide commands to the motor controller IC for dynamic motion adjustment, including commands for speed synchronization and/or torque command tailoring. The wireless communication IC may be used to interface with a "smart" home system that regulates one or more operations of the appliance, including motor function. Thus, the wireless communication IC may receive communication data from the smart home system, such as turn-on and turn-off commands, or standby or low power commands. Motor settings may also be received in communication data.

In an example of an air conditioning unit, a smart thermostat may send communication data to the radio IC based on measured ambient temperature and programmed temperature settings. The communication data may provide start/stop commands based on maintaining a desired programmed temperature. The wireless communication IC may process this communication data and provide start/stop commands to the motor controller IC to initiate the instructed action.

Settings may also be included in communication data, including turn-on and turn-off durations that define a period for the motor to be on or off, or speed setting durations that define both a motor speed and a period for the motor to run at that speed. These settings may be stored at the wireless communication IC and may be updated periodically via communication data received by the wireless communication IC from the radio IC. The wireless communication IC may then issue turn-on and turn-off commands or speed adjustment commands to the motor controller IC based on these settings that are stored and monitored at the wireless communication IC. For example, the wireless communication IC may track a time or a duration, and initiate an appropriate command to the motor controller IC upon arrival of a configured time or at an expiration of a set duration based on the stored settings.

In addition, the motor controller IC may relay motor status and control information to the wireless communication IC, the wireless communication IC may then process this information, and transmit appropriate communication data to the radio IC for wireless transmission to an external device (e.g., a user device). For example, the motor controller IC may provide emergency reporting of a thermal overstress condition or may communicate a need to either shutdown or reduce a current reference immediately.

The wireless communication IC may be configured with a core processer that has processor base frequency (i.e., CPU core clock speed) that is greater than the processor base frequency of the motor controller IC. In one example, the wireless communication IC may have a processor base frequency of 150 MHz and the motor controller IC may have a processor base frequency of 48 MHz. However, the processor base frequencies are not limited thereto and may vary based on the intended application.

In addition, the wireless communication IC and the motor controller IC may be made from different lithography processes, where the wireless communication IC is manufactured using a smaller technology node than the motor controller IC. For example, the motor controller IC may be made from a 55 nanometer (55 nm) lithography process and the wireless communication IC may be made from a 40 nm lithography process. However, the technology node of each IC is not limited thereto and may vary based on the intended application.

Thus, the two ICs can be optimized according to application in a cost efficient manner.

Figure 2B:
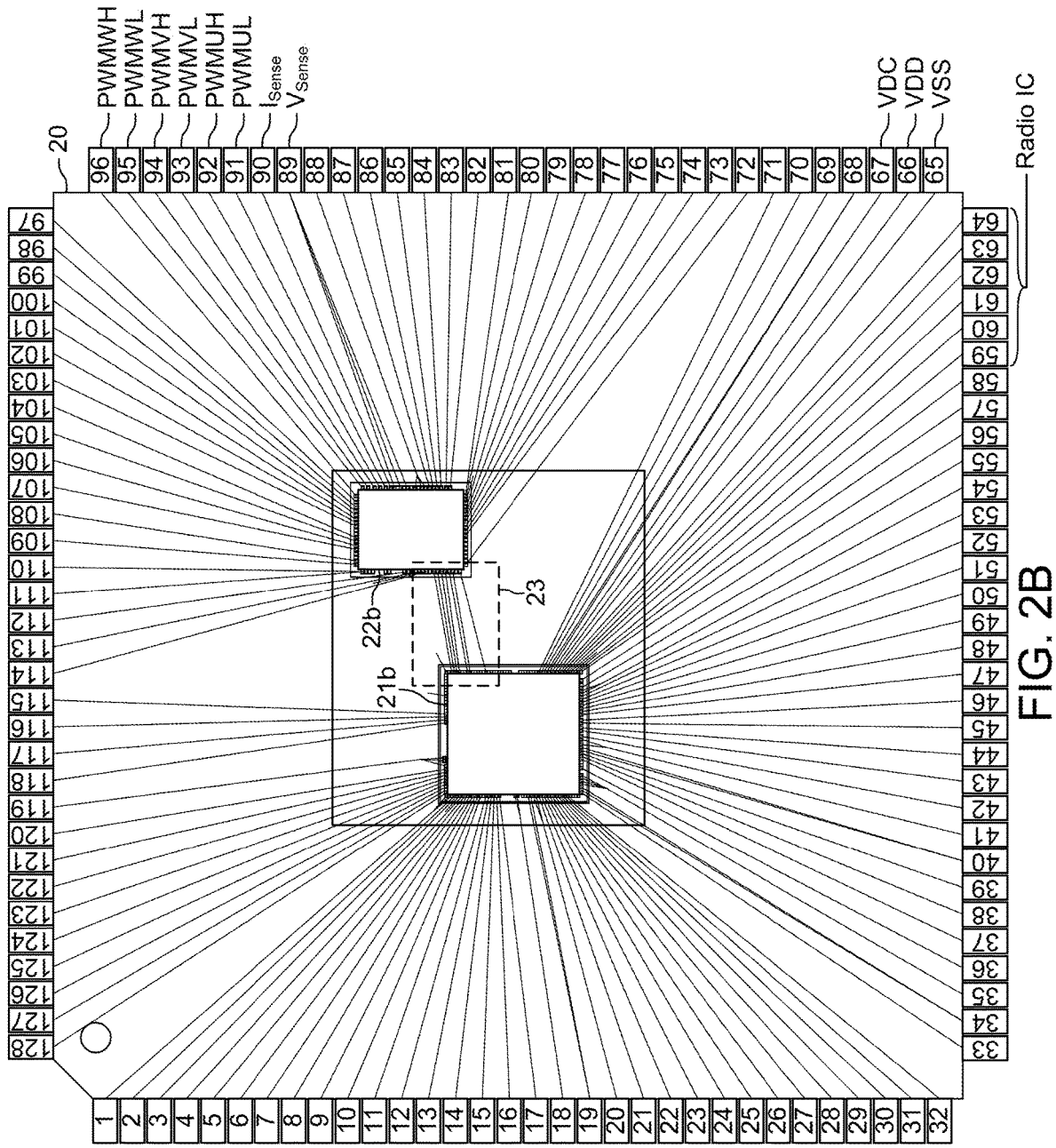
FIG. 2B is a plan view of the IC package according to one or more embodiments.

FIG. 2A is a schematic block diagram of an IC package 20 having wireless communication enabled motor control integrated circuit functions according to one or more embodiments. Similarly, FIG. 2B is a plan view of the IC package 20 according to one or more embodiments.

In particular, the IC package 20 is a 128 pin Low Profile Quad Flat Pack (LQFP). However, the type of package is not limited to a number of pins or a package type. Thus, IC package 20 may be any other package type, such as a Quad Flat Nolead (QFN) package, and can be used with a different number of pin options.

The IC package 20 contains two main functions. A first main function is wireless communication data processing 21a and a second main function is motor control function 22a. The motor control function 22a can include either controlling a permanent magnet motor or an induction motor and can be configured as a sensorless control not requiring the rotor position sensing or as a sensor based control with Hall sensors and/or an encoder device. Thus, the motor control function 22a may include any control function used for controlling the gate driver IC and/or the motor, and may include performing a plurality of functions for accomplishing that task.

The wireless communication data processing 21a includes performing http web server management, Cloud services handling, and interfacing to the mating motor control function. For example, the IC package 20 may be coupled via one or more of its pins to a radio IC (not shown) that is further coupled to an antenna (not shown). The antenna is configured to receive and transmit wireless communication data, and the radio IC is configured as an interface between the antenna and the IC package 20. Thus, the wireless communication data processing 21a may be configured to transmit and to receive wireless communication data via uplink and downlink channels coupled to the radio IC, process the uplink and the downlink wireless communication data, and interface with the motor control function. Here, uplink wireless communication data is data received from the radio IC (i.e., input to the package 20), and downlink wireless communication data is data transmitted to the radio IC (i.e., output from the package 20).

The motor control function 22a includes performing motor speed control as well as torque control by sensing a motor current and generating PWM control signals based on a feedback control loop, and optionally performing an additional power factor correction (PFC) function to generate PFC control signals. The PFC control may be incorporated into the motor control function 22a by means of firmware. In other words, motor control function 22a performs similar functions for motor control as described above in reference to the MCU 5. Here, however, the gate driver IC is provided external to the MCU 5 (i.e., external to the IC package 20) and may be integrated with the power inverter 1 (see e.g., gate driver IC 7 in FIG. 3).

In addition, the two main functions 21a and 22a are configured to communicate with each other through an intercommunication interface 23. Inter-communication between the two main functions may be implemented by RS-232C serial communication plus additional multiple wires for real-time, fast-event handling information exchange.

For example, a speed setpoint command, a start command, a stop command, and/or a dynamic torque limit value update command may be generated by the communication data processing 21a based on wireless communication data received from a radio IC, and sent by the communication data processing 21a to the motor control function 22a for modifying a motor control function.

A speed setpoint command may be used to set and/or adjust a motor speed according to a motor control function 22a. This command may be used to increase or decrease a current motor speed. A start command may be used to start a motor according to a motor control function 22a, and a stop command may be used to stop or shut down the motor according to a motor control function 22a. A dynamic torque limit value update command may be used to adjust the torque of the motor according to a motor control function 22a.

Conversely, motor speed feedback information, power metering information, motor drive fault status, power inverter temperature, and/or a motor temperature may be measured or generated by the motor control function 22a and sent to the communication data processing 21a. Upon receiving one or more of the above information, the communication data processing 21a may process the information and prepare wireless communication data for transmission to the radio IC. In other words, the communication data processing 21a may generate communication messages (e.g., data packets) containing the information received from the motor control function 22a.

Thus, FIG. 2A shows integrating two functions, namely a motor control function and wireless communication data processing, by two integrated circuits in a single package.

As shown in FIG. 2B, these two main functions 21a and 22a are physically realized by two integrated circuits: wireless communication IC 21b and motor controller IC 22b, respectively. The wireless communication IC 21b and motor controller IC 22b are coupled to the pins of the package 20 via bond wires in order to receive power VDC as well as to communicate with peripherals (e.g., the gate driver IC, the radio IC, the PFC IC, and the like). In addition, the wireless communication IC 21b and motor controller IC 22b connected together by the intercommunication interface 23, which, in this example, includes six bond wires (i.e., interconnection wires). Here, the inter-communication between the wireless communication IC 21b and the motor controller IC 22b may be implemented by RS-232C serial communication plus additional multiple wires for real-time, fast-event handling information exchange.

For example, a speed setpoint command, a start command, a stop command, and/or a dynamic torque limit value update command may be generated by the wireless communication IC 21b based on wireless communication data received from a radio IC, and sent by the wireless communication IC 21b to the motor controller IC 22b for modifying a motor control function implemented by the motor controller IC 22b. These commands may be sent over the serial communication interface in the form of periodic updates or over the real-time event communication interface for event handling. In other words, periodic updates may be scheduled communications, whereas real-time event communications may be unscheduled communications that are prioritized over other types of communications, including the periodic updates.

A speed setpoint command may be used to set and/or adjust a motor speed according to a motor control function implemented by the motor controller IC 22b. This command may be used to increase or decrease a current motor speed. A start command may be used to start a motor according to a motor control function implemented by the motor controller IC 22b, and a stop command may be used to stop or shut down the motor according to a motor control function implemented by the motor controller IC 22b. A dynamic torque limit value update command may be used to adjust the torque of the motor according to a motor control function implemented by the motor controller IC 22b.

Conversely, motor speed feedback information, power metering information, motor drive fault status, power inverter temperature, and/or a motor temperature may be measured or generated by the motor controller IC 22b and sent to the wireless communication IC 21b. Periodic updates, including motor speed feedback information, power metering information, power inverter temperature, and/or motor temperature may be sent over the serial communication interface.

Event information, such as motor control fault information, including over-temperature, over-current, and/or an over-voltage at the power inverter 1 or an over-temperature at the motor, may be sent over the real-time event communication interface, as well as motor control function commands in response thereto.

Upon receiving one or more types of information from the motor controller IC 22b, the wireless communication IC 21b may process the information and prepare wireless communication data for transmission to the radio IC. In other words, the wireless communication IC 21b may generate communication messages (e.g., data packets) containing the information received from the motor controller IC 22b.

Some of the pins of the IC package 20 may be coupled to the wireless communications IC 21b and motor controller IC 22b. For example, pins PWMWH, PWMWL, PWMVH, PWMVL, PWMUH, and PWMUL, may be used to control a respective phase current in a power inverter (e.g., power inverter 1 as shown in FIG. 1A), and may be further coupled to the gate driver IC of the power inverter. Here, pins PWMWH and PWMWL are used to output PWM control signals for controlling a high-side and a low-side transistor of the W phase current, pins PWMVH and PWMVL are used to output PWM control signals for controlling a high-side and a low-side transistor of the V phase current, and pins PWMUH and PWMUL are used to output PWM control signals for controlling a high-side and a low-side transistor of the U phase current.

In addition, pins Isense and Vsense may be coupled to the motor controller IC 22b and used to receive a motor current or voltage, respectively, to enable motor controller IC 22b to measure the same for feedback control. Additional pins may be coupled to the motor controller IC 22b and dedicated to PFC control functions. Additional pins may also be used to interface the wireless communications IC 21b with the radio IC. Furthermore, the power pads such as VDD and VSS may be shared respectively between the wireless communications IC 21b and the motor controller IC 22b.

As described above, the wireless communications IC 21b performs Wifi/Bluetooth communication data processing while the motor controller IC 22b performs a motor control function. Two of the six inter-connection wires of the intercommunication interface 23 are dedicated to serial communication (e.g., RS-232C communication) between the two ICs. The serial communication may include periodic reporting between the two ICs. For example, the motor controller IC 22b may track an amount of power applied or consumed by the motor as motor power metering information, and the motor power metering information can be periodically sent from the motor controller IC 22b to the wireless communications IC 21b over the serial communication interface. Communications for other periodic motor status updates may also be sent from the motor controller IC 22b over the serial communication interface.

Conversely, the wireless communications IC 21b may send power adjustment commands in periodic updates to the motor controller IC 2b over the serial communication interface to adjust the power applied to drive the motor. For example, power adjustment commands may be sent to reduce a current power level or to increase a current power level for motor power control. Communications for other motor function updates may also be sent from the wireless communications IC 21b over the serial communication interface.

The remaining four wires of the intercommunication interface 23 are dedicated to real-time event communication between the ICs. Real-time event communication may include urgent communications such as motor control fault information or emergency reporting of a thermal overstress condition or communicating a need to either shutdown or reduce a current reference immediately. For example, motor control fault information may signal an over-temperature, over-current, and/or an over-voltage at the power inverter 1 via the real-time event communication interface. Motor control fault information may also be used to indicate an over temperature at the motor. This fault information can be sent in real-time (i.e., upon detection of the fault event by the motor controller IC 22b) instead of as a periodic update so that appropriate action is taken in an appropriate amount of time (e.g., immediately, if necessary).

In response to receiving motor control fault information, the wireless communications IC 21b may respond with one or more commands over the real-time event communication for instructing the motor controller IC 22b to take a certain action (e.g., stop command, decrease a current motor speed with a speed setpoint command, decrease a torque with a torque limit value update command, etc.). The wireless communication IC 21b may also seek instructions from an external device for event handling, and relay instructions to the motor controller IC 22b upon receiving them from the external device (i.e., via the radio IC) and processing them.

The real-time event communication triggers the motor control IC 22b to change an operation of the motor control function. For example, to stop the motor. Therefore, these four wires complement the communication exchange provided by the serial communication wires in that they supplement the regular periodic communication provided by the RS-232C.

Figure 3:
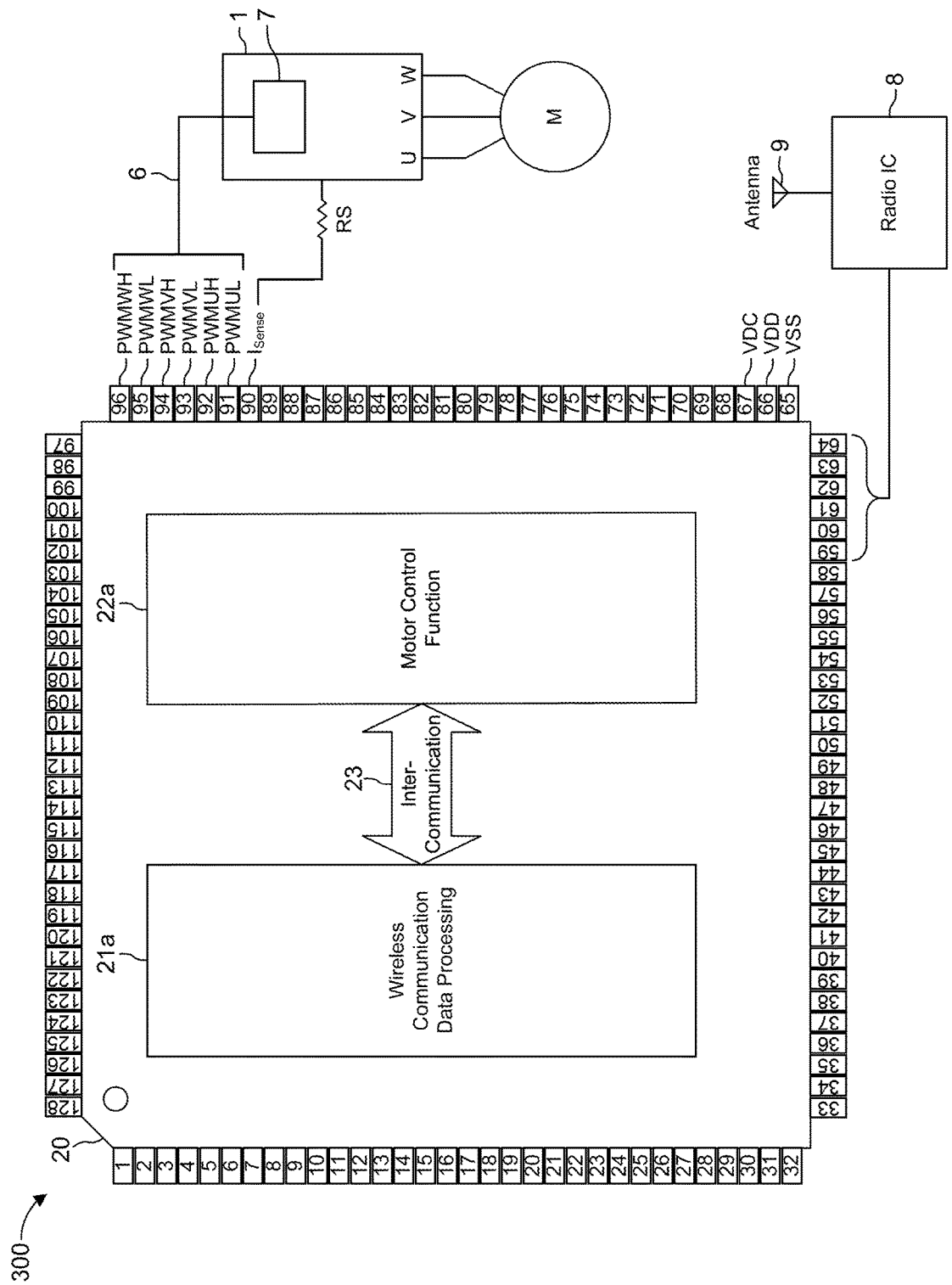
FIG. 3 shows a schematic block diagram of an example application configuration using the IC package according to one or more embodiments.

The IC package 20, including the wireless communications IC 21b and the motor controller IC 22b, may be used to interface with the power inverter 1 and the radio IC 8 with antenna 9. For example, FIG. 3 shows a schematic block diagram of an example application configuration 300 using the IC package 20 according to one or more embodiments. Specifically, the application configuration 300 shows a three-phase motor control with wireless communication function, which can be used in a wide range of appliance motor control schemes. The IC package 20 is coupled to the radio IC 8 via various pins. In addition, six pins of the IC package 20 (i.e., PWMWH, PWMWL, PWMVH, PWMVL, PWMUH, and PWMUL) are coupled to the gate driver IC 7 that is integrated with the power inverter 1 for controlling the motor function. Lastly, the Isense pin of the IC package 20 is coupled to shunt resistor Rs for receiving (sensing) the motor current, which is used for motor feedback control by the motor controller IC 22b.

With this arrangement, the real-time processing of the motor control function implemented by the motor controller IC 22b can be safeguarded while still enabling wireless communications that interface with the motor controller IC 22b.

It will also be appreciated that the radio IC 8 may be integrated within the IC package 20, and coupled to the wireless communications IC 21b via bond wires within the package. In this case, the IC package 20 may have at least one pin dedicated as an antenna pin for being coupled to the antenna 9 located outside the package.

According to the above embodiments, the wireless communications IC 21b and the motor controller IC 22b are configured to operate independently to handle their respective processing loads (i.e., wireless communication data processing load vs. motor control processing load), in parallel. The two dies are integrated into one package 20.

Figure 4:
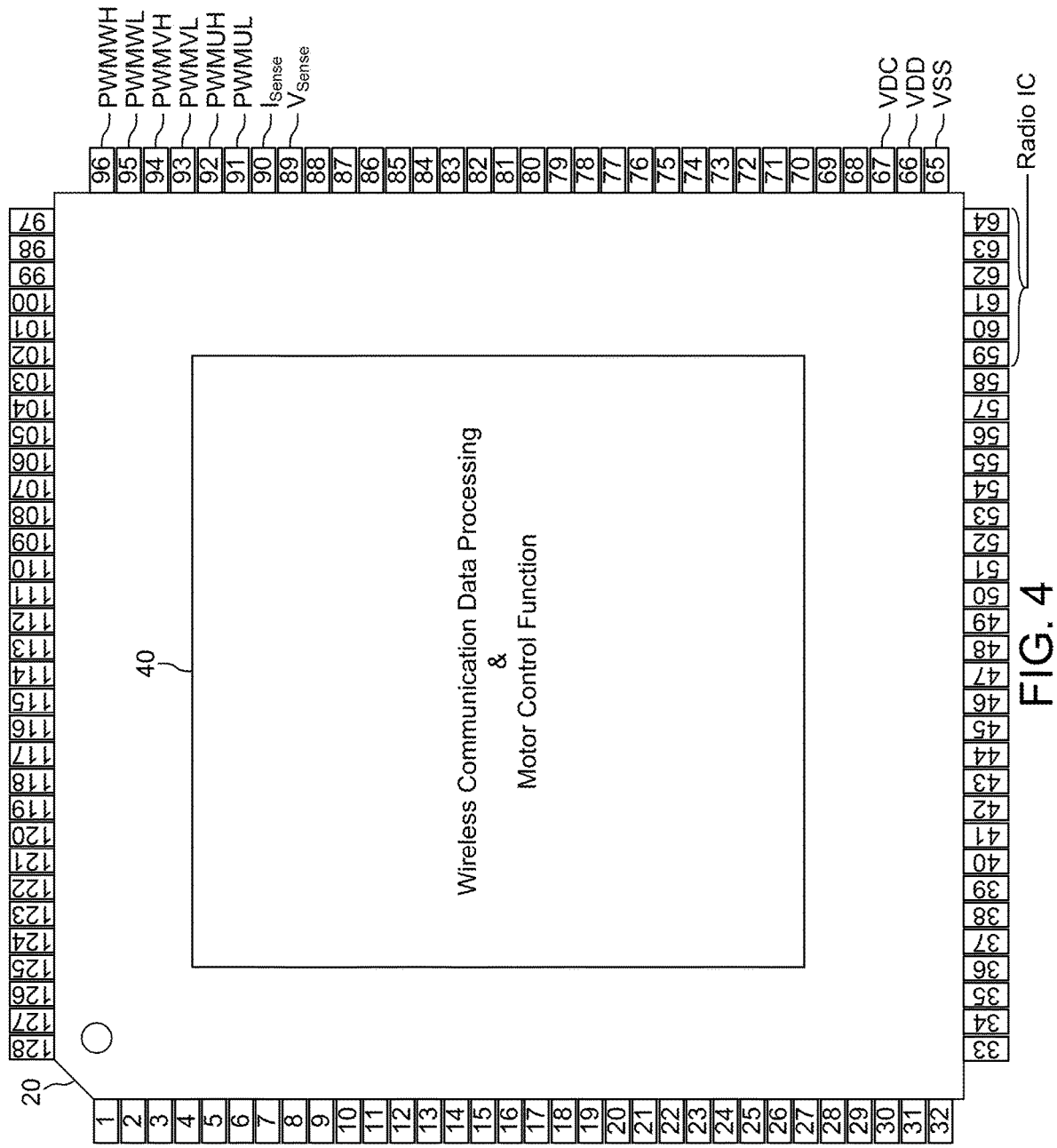
FIG. 4 is a schematic block diagram of an IC package having monolithic integration of wireless communication and motor control functions according to one or more embodiments.

FIG. 4 is a schematic block diagram of an IC package having monolithic integration of wireless communication and motor control functions according to one or more embodiments. The two functions, namely a motor control and Wifi/Bluetooth communication data processing, are integrated by one monolithically integrated circuit 40 being packaged into one package 20. Thus, extending to the next level of integration, the wireless communications IC 21b and the motor controller IC 22b can be monolithically integrated forming one physical integrated circuit 40 while performing both motor control function as well as Wifi/Bluetooth communication data processing.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Depending on certain implementation requirements, embodiments provided herein can be implemented in hardware or in software. The implementation can be performed using a digital storage medium, for example a floppy disk, a DVD, a Blue-Ray, a CD, a RAM, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A control unit including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes a computer program to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A motor controller, comprising:
    a package configured to interface with a power inverter for motor control;
    a wireless communication integrated circuit (IC) integrated within the package and configured to receive uplink wireless communication data and to process the uplink wireless communication data, and configured to transmit downlink wireless communication data;
    a motor controller IC integrated within the package and configured to perform a motor control function, including generating pulse width modulation (PWM) control signals for multi-phase motor control; and
    an intercommunication interface coupled to the wireless communication IC and the motor controller IC, the intercommunication interface including a plurality of inter-communication wires for information exchange of uplink information and downlink information between the wireless communication IC and the motor controller IC,
    wherein the package is a chip package,
    wherein the intercommunication interface is integrated within the chip package,
    wherein the chip package comprises a plurality of pins including a first set of pins assigned to the wireless communication IC and a second set of pins assigned to the motor controller IC, and
    wherein the first set of pins are directly coupled to the wireless communication IC and the second set of pins are directly coupled to the motor controller IC.

2. The motor controller of claim 1, wherein the wireless communication IC is configured to process the uplink wireless communication data, generate a motor control function command based on the processed uplink wireless communication data, and transmit the motor control function command as the uplink information to the motor controller IC over at least one of the plurality of inter-connect wires.

3. The motor controller of claim 2, wherein the uplink wireless communication data includes at least one of a motor speed setpoint command, a motor start command, a motor stop command, and a motor torque limit value update command.

4. The motor controller of claim 2, wherein the motor controller IC is configured to receive the motor control function command and adjust the motor control function based on the motor control function command.

5. The motor controller of claim 1, wherein the motor controller IC is configured to generate feedback information, and transmit the feedback information as the downlink information to the wireless communication IC over at least one of the plurality of inter-connect wires.

6. The motor controller of claim 5, wherein the wireless communication IC is configured to receive the feedback information, generate the downlink wireless communication data based on the feedback information, and transmit the downlink wireless communication data from the package.

7. The motor controller of claim 5, wherein the feedback information includes at least one of motor speed feedback information, power metering information, motor drive fault status information, power inverter temperature information, power inverter over-current information, power-inverter over-voltage information, and motor temperature information.

8. The motor controller of claim 1, wherein the motor controller IC is configured to perform the motor control function continuously, in real-time, such that PWM control signals are generated every PWM cycle, without PWM cycle interrupt caused by the uplink wireless communication data.

9. The motor controller of claim 1, wherein the motor control function includes measuring a motor phase current and applying the measured motor phase current to at least one motor control algorithm to generate the PWM control signals.

10. The motor controller of claim 1, wherein the plurality of inter- communication wires includes a first subset of inter-communication wires dedicated to serial communication between the wireless communication IC and the motor controller IC, and further includes a second subset of inter-communication wires dedicated to real-time event communication between the wireless communication IC and the motor controller IC.

11. The motor controller of claim 10, wherein the serial communication is periodically exchanged between the wireless communication IC and the motor controller IC on a regular basis.

12. The motor controller of claim 10, wherein the wireless communication IC is configured to transmit motor control function commands periodically to the motor controller IC via at least a first one of the first subset of inter-communication wires, and the motor controller IC is configured to transmit feedback information periodically to the wireless communication IC via at least a second one of the first subset of inter-communication wires.

13. The motor controller of claim 10, wherein the motor controller IC is configured to transmit motor control fault information to the wireless communication IC via at least a first one of the second subset of inter-communication wires in response to a fault event, and the wireless communication IC is configured to transmit at least one motor control function command via at least a second one of the second subset of inter-communication wires in response to the motor control fault information.

14. The motor controller of claim 13, wherein the wireless communication IC is configured to receive the motor control fault information, generate the downlink wireless communication data based on the motor control fault information, and transmit the downlink wireless communication data from the package.

15. The motor controller of claim 10, wherein the serial communication is RS-232C serial communication.

16. The motor controller of claim 10, wherein a number of inter-communication wires in the first subset is less than a number of inter-communication wires in the second subset.

17. The motor controller of claim 10, wherein the real-time event communication triggers the motor control IC to change an operation of the motor control function.

18. The motor controller of claim 1, wherein the wireless communication IC has a processor base frequency greater than a processor base frequency of the motor controller IC.

19. The motor controller of claim 1, wherein the motor controller IC further performs a power factor correction function.

20. A method for wireless communication with a motor controller, the method comprising:
receiving and processing uplink wireless communication data by a wireless communication integrated circuit (IC);
transmitting downlink wireless communication data by the wireless communication IC, wherein the wireless communication IC is connected directly to a first set of pins of a chip package that are dedicated to the uplink wireless communication data and the downlink wireless communication data;
performing a motor control function, including generating pulse width modulation (PWM) control signals for multi-phase motor control by a motor controller IC that is integrated in the same chip package as the wireless communication IC, wherein performing the motor control function includes transmitting the PWM control signals from the motor controller directly to a second set of pins of the chip package that are dedicated to the PWM control signals; and
exchanging information via an intercommunication interface integrated within the chip package and coupled to the wireless communication IC and the motor controller IC, the information being exchanged between the wireless communication IC and the motor controller IC as uplink information and downlink information.

21. The motor controller of claim 1, wherein:
the first set of pins are configured to receive the uplink wireless communication data and transmit the uplink wireless communication directly to the wireless communication IC,
the first set of pins are configured to receive the downlink wireless communication data directly from the wireless communication IC and transmit the downlink wireless communication data, and
the second set of pins are configured to receive the PWM control signals directly from the motor controller IC and transmit the PWM control signals.

22. The motor controller of claim 21, wherein the plurality of pins include a motor feedback pin assigned to the motor controller IC, the motor feedback pin configured to receive a motor current or a motor voltage and provide the motor current or the motor voltage directly to the motor controller IC as feedback information, wherein the motor feedback pin is directly coupled to the motor controller IC.

23. The motor controller of claim 22, wherein the motor feedback pin is directly coupled to the motor controller IC.

24. The motor controller of claim 1, wherein the power inverter is external to the package.

25. The motor controller of claim 22, wherein the motor controller IC is configured to adjust the PWM control signals in real-time based on the feedback information and transmit the adjusted PWM control signals directly to the second set of pins.

* * * * *